(12) United States Patent
Wilson et al.

(10) Patent No.: US 11,021,349 B2
(45) Date of Patent: Jun. 1, 2021

(54) UTILITY VEHICLE HAVING COLLAPSIBLE GAME HANGER APPARATUS

(71) Applicant: KUBOTA CORPORATION, Osaka (JP)

(72) Inventors: Travis Wilson, Osaka (JP); Aubrey Jarvis, Atlanta, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/201,077

(22) Filed: Nov. 27, 2018

(65) Prior Publication Data

US 2020/0165110 A1    May 28, 2020

(51) Int. Cl.
| | | |
|---|---|---|
| *B66D 1/60* | (2006.01) | |
| *A01M 31/00* | (2006.01) | |
| *B62D 33/02* | (2006.01) | |
| *B66D 1/12* | (2006.01) | |

(52) U.S. Cl.
CPC .............. *B66D 1/60* (2013.01); *A01M 31/006* (2013.01); *B66D 1/12* (2013.01); *B62D 33/02* (2013.01)

(58) Field of Classification Search
CPC ...... A01M 31/006; B60P 1/5471; B66D 1/60; B66D 1/12; B62D 33/02
See application file for complete search history.

(56) References Cited

U.S. PATENT DOCUMENTS

| | | | | |
|---|---|---|---|---|
| 4,069,922 A | * | 1/1978 | Hawkins | B66C 23/42 212/181 |
| 5,662,451 A | * | 9/1997 | Muzzi | B60P 1/5471 212/180 |
| 6,530,738 B2 | * | 3/2003 | Maxwell | B60P 1/54 212/180 |
| 6,705,821 B2 | | 3/2004 | Philips et al. | |
| 6,921,007 B1 | * | 7/2005 | Guerrant | B60R 9/06 224/519 |
| 6,981,834 B1 | * | 1/2006 | Henry | B60P 1/5471 212/299 |
| 7,156,246 B2 | * | 1/2007 | Sherrod | B66C 23/44 212/180 |
| 7,300,238 B1 | * | 11/2007 | James | B60P 1/5471 414/540 |
| 7,374,388 B2 | * | 5/2008 | Holt | B60P 1/5471 212/180 |
| 7,549,545 B1 | * | 6/2009 | Ashmore | A01M 31/006 212/180 |
| 7,611,320 B2 | * | 11/2009 | Bell | B60P 3/41 144/4.1 |
| 7,625,269 B2 | * | 12/2009 | Godwin | A22B 5/06 452/129 |

(Continued)

*Primary Examiner* — Kaitlin S Joerger
(74) *Attorney, Agent, or Firm* — Greenblum & Bernstein, P.L.C.

(57) ABSTRACT

A utility vehicle having a collapsible game hanger apparatus includes a cargo box, a hitch receiver disposed under the cargo box and included in a rear structure, a hoist structure, a winch device, and a winch mounting bracket. The hoist structure consists of a base bar detachably attached to the hitch receiver, a mast attached to an end portion of the base bar, and a boom attached to an upper end of the mast. The winch device consists essentially of a winch detachably attached to a winch mounting bracket and a pulley unit for guiding the winch cable.

10 Claims, 4 Drawing Sheets

(56) References Cited

U.S. PATENT DOCUMENTS

| | | | | |
|---|---|---|---|---|
| 7,931,524 B2* | 4/2011 | McKenzie | ............... | A22B 5/06 |
| | | | | 452/187 |
| 8,322,964 B2* | 12/2012 | O'Brien | ................. | B60P 1/283 |
| | | | | 414/462 |
| 9,282,752 B1* | 3/2016 | Wylie | .................... | A22B 5/161 |
| 9,327,947 B2* | 5/2016 | Davis | ...................... | B66C 23/44 |
| 9,877,490 B1* | 1/2018 | Lee | .......................... | A22B 5/06 |
| 2005/0230340 A1* | 10/2005 | Barger, Sr. | .............. | B66C 23/44 |
| | | | | 212/280 |
| 2006/0045704 A1* | 3/2006 | Laufenberg | ............. | B60P 1/548 |
| | | | | 414/543 |
| 2006/0182571 A1* | 8/2006 | Hightower | ............. | A01K 15/00 |
| | | | | 414/466 |
| 2010/0111658 A1* | 5/2010 | Galliano | ............ | A01M 31/006 |
| | | | | 414/462 |

* cited by examiner

UTILITY VEHICLE HAVING COLLAPSIBLE GAME HANGER APPARATUS

TECHNICAL FIELD

The present invention relates to a utility vehicle having a collapsible game hanger apparatus and relates also to the collapsible game hanger apparatus.

BACKGROUND ART

U.S. Pat. No. 6,705,821 discloses a collapsible game hanger apparatus for use with a pickup truck. This game hanger apparatus is mounted to a trailer hitch of a pickup truck as one kind of a utility vehicle. This apparatus includes a bottom bar, a mast, and a boom pivotally coupled to each other. The bottom bar can be attached to a hitch bar of the vehicle body. At an intermediate portion of the mast, a winch is attached. A cable drawn out of the winch is entrained around two pulleys and is extended downwards from a leading end of the boom. At the leading end of the cable, a gambrel is attached. The game hanger apparatus when collapsed can be carried into a bed of the track.

In the game hanger apparatus according to U.S. Pat. No. 6,705,821, the heavy winch is attached to the mast, so a large load is applied to the mast. In the case of a manual operation type winch, a crank lever is used. So, when a lifting load is large, a significant moment will be applied to the mast at time of a rotational operation of the crank lever, which leads to swaying of the mast. And, such swaying of the mast makes a hoisting work of a game, etc. difficult. Such swaying of the mast applies load to the bottom bar also. In the case of an electric motor driven winch, a moment applied to the mast is smaller, but a wiring arrangement of a power supply cable to the motor is troublesome since this motor and the truck vehicle body are far apart from each other.

SUMMARY OF THE INVENTION

An object of the present invention is to provide a collapsible game hanger apparatus for use with a utility vehicle, which apparatus presents less problem in its use with either a manual operation type winch or an electric motor driven winch.

According to the present invention, a utility vehicle having a collapsible game hanger apparatus comprises a cargo box mounted on a rear structure of a vehicle body frame, a hitch receiver disposed under the cargo box and included in the rear structure, a hoist structure, a winch device, and a winch mounting bracket. The hoist structure consists essentially of a base bar detachably attached to the hitch receiver, a mast attached via a first hinge portion to an end portion of the base bar, and a boom attached via a second hinge portion to an upper end of the mast. The winch mounting bracket is attached to the cargo box or a vehicle body constituent member, preferably to a top of a front wall. The winch device consists essentially of a winch detachably attached to the winch mounting bracket, a winch cable to be unwound from and wound back to the winch, and a pulley unit having a plurality of pulleys that guide the winch cable. A gambrel is attached to a leading end of the winch cable.

With the above-described arrangement, since the winch which is the main body of the winch device is attached not to a member of the hoist structure such as the mast, but to a vehicle constituent member (the cargo box or its periphery), the weight of the winch is not applied to the hoist structure. In a work of hoisting a game or the like, namely, a winding operation of the cable by the winch, the effect of a reaction force or vibration that occurs in the winch per se is not applied to the hoist structure. Further, in the case of an electric driven winch which employs a motor, the attachment of the winch to the vehicle constituent member allows preliminary installment of a power supply wiring to a battery mounted on the vehicle body.

DETAILED DESCRIPTION

Next, an embodiment of a utility vehicle according to the present invention will be explained with reference to the accompanying drawings.

Incidentally, in this detailed description, unless indicated explicitly otherwise, a word "front" means the front (forward) side in a vehicle front-rear direction (traveling direction) and a word "rear" means the rear side with respect to the vehicle front-rear direction (traveling direction). Further, a left-right direction or a transverse direction means a vehicle body transverse direction (vehicle body width direction) perpendicular to the vehicle body front-rear direction. A word "upper" or "lower" designates positional relationship with respect to the perpendicular direction of the vehicle body (vertical direction), indicative of a relationship regarding a ground-clearance height.

Figure 1:
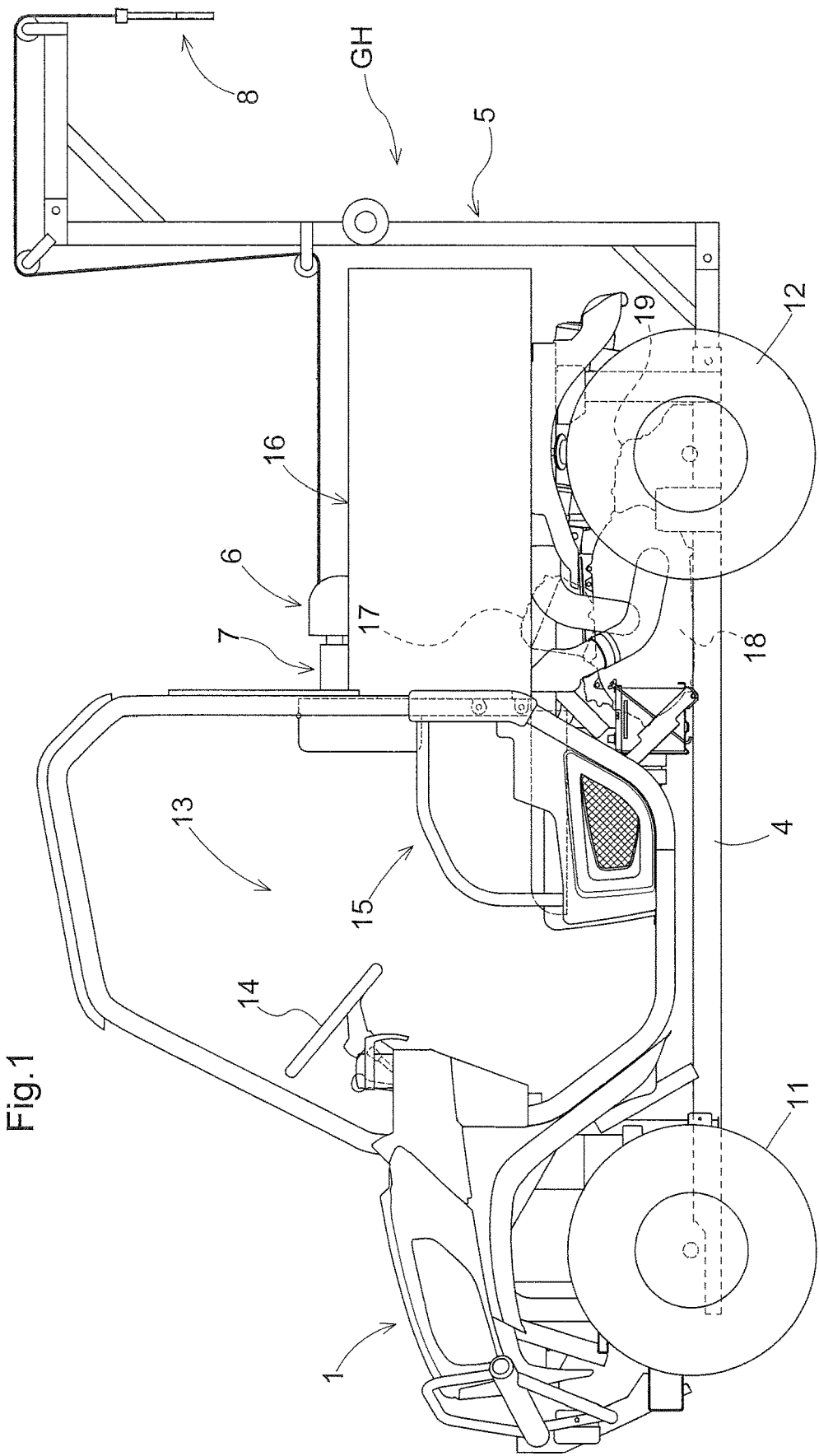
FIG. 1 is a side view showing a utility vehicle in its entirety.

FIG. 1 is a side view showing the utility vehicle. This utility vehicle is a four-wheel drive vehicle having front wheels 11 and rear wheels 12 both configured as drive wheels. The front wheels 11 are steerable, while the rear wheels 12 are not. A vehicle body 1 supported by the front wheels 11 and the rear wheels 12 includes a maneuvering section 13 and a cargo box 16. The maneuvering section 13 includes a steering wheel 14 and a seat 15. Under the cargo box 16, there are mounted an engine 17, a stepless speed changer device 18 and a transmission 19. This utility vehicle includes a collapsible game hanger apparatus GH.

Power of the engine 17 is steplessly speed-changed by the stepless speed changer device 18 and then transmitted therefrom to the transmission 19. Further, power from this transmission 19 is transmitted via a propeller shaft (not shown) extending in the vehicle front-rear direction to a front wheel drive mechanism FD to rotate the front wheels 11.

Figure 2:
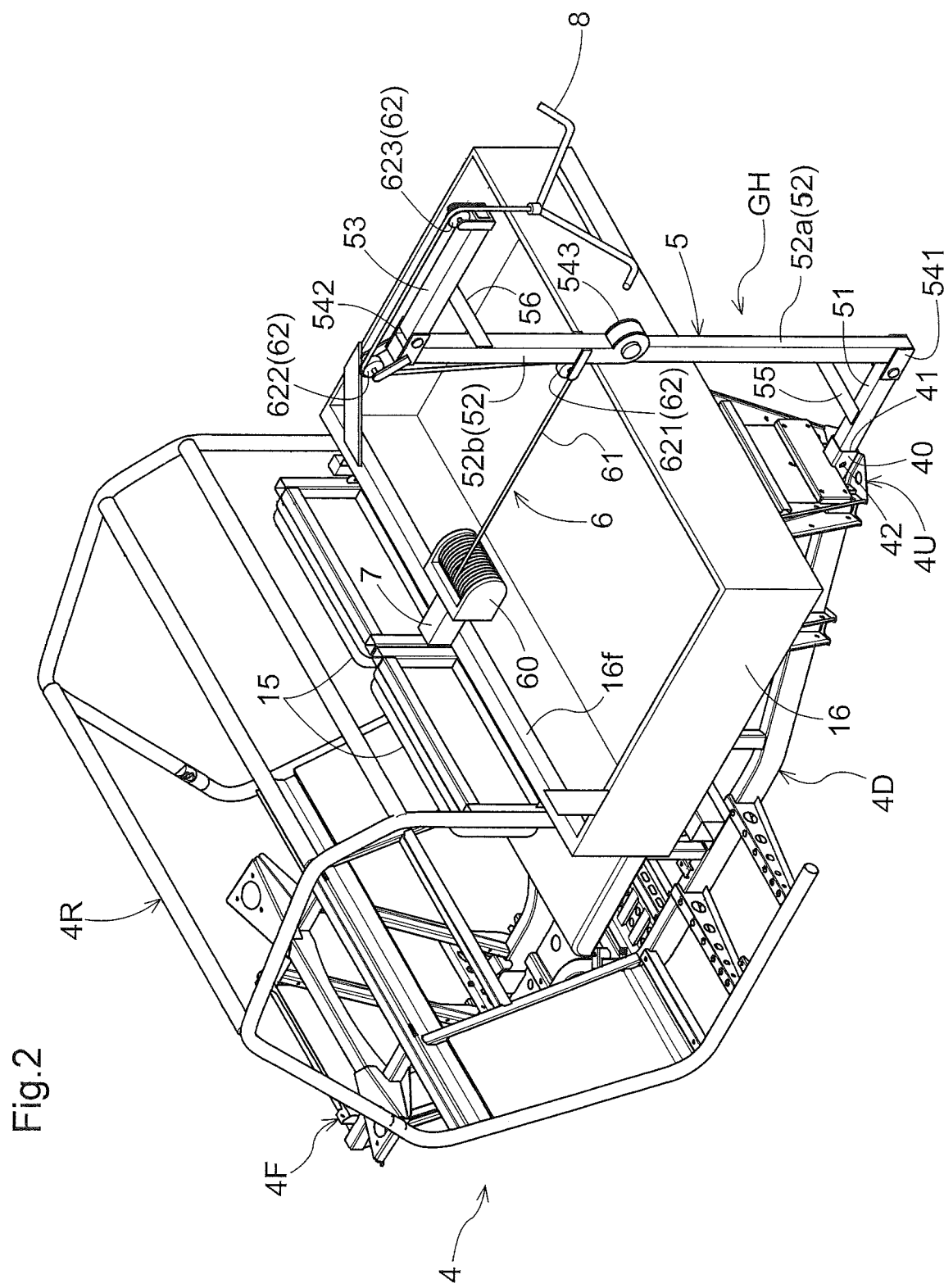
FIG. 2 is a perspective view showing a game hanger apparatus attached to a vehicle body frame structure and to a cargo box of the utility vehicle.
Figure 3:
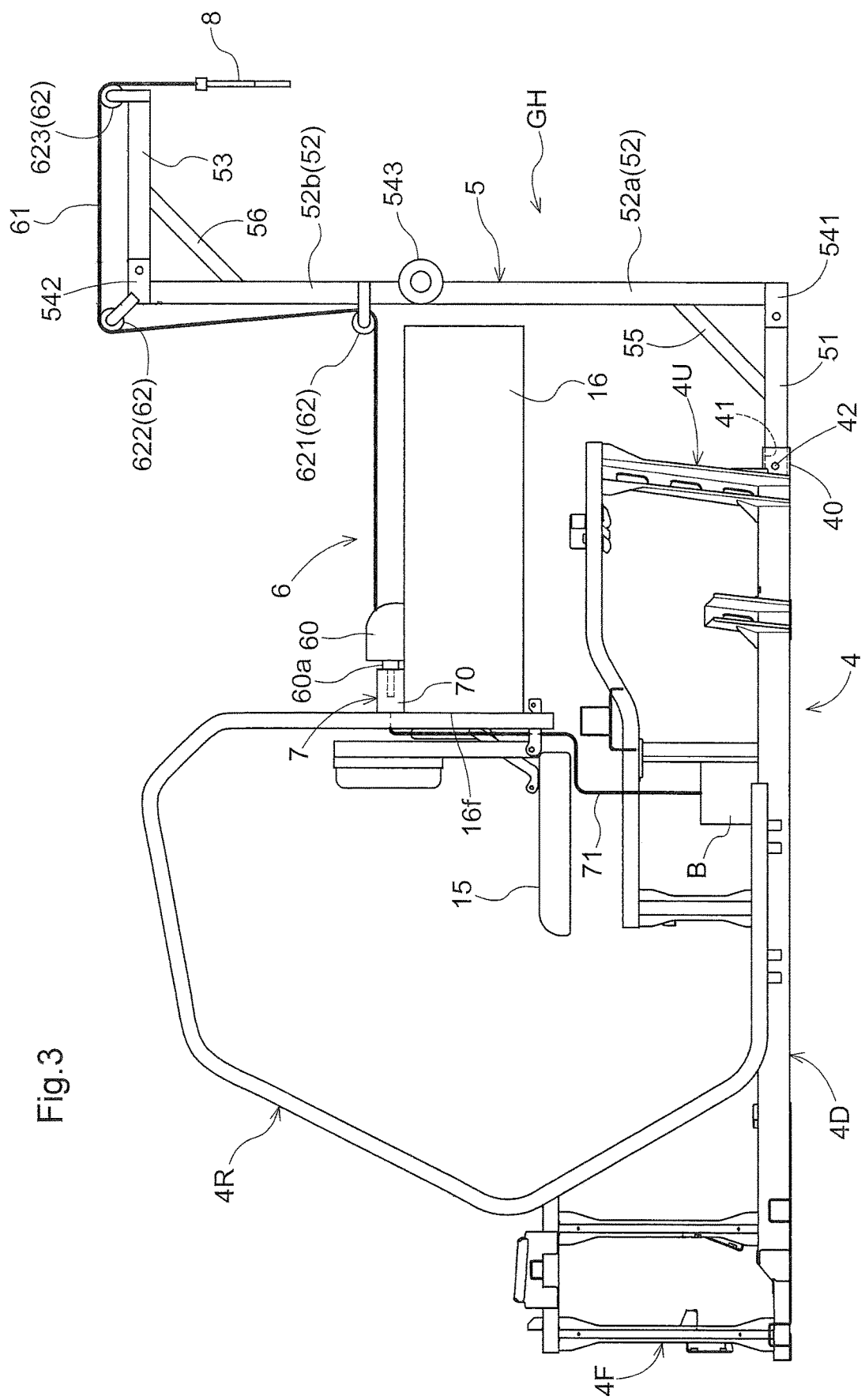
FIG. 3 is a side view showing the game hanger apparatus attached to the vehicle body frame structure and to the cargo box of the utility vehicle.

FIG. 2 and FIG. 3 show a vehicle body frame structure 4, the cargo box 16, the seat 15 and the game hanger apparatus GH. FIG. 2 is its perspective view and FIG. 3 is its side view.

The vehicle body frame structure 4 is composed of steel tube (pipe) members and plate members and consists of an upper structure 4U, a lower structure 4D a front structure 4F, and a ROPS structure 4R. The lower structure 4D constitutes the "base" of the vehicle body frame structure 4 and extends in the vehicle body front-rear direction. The upper structure 4U is disposed vertically at a rear area of the lower structure 4D and forms a "support deck" for the seat 15, the cargo box 16, etc. The front structure 4F is disposed vertically at front area of the lower structure 4A. The ROPS structure 4R has a greater width than the lower structure 4D and is disposed vertically at a front area of the lower structure 4D. At a rear end portion of the lower structure 4D, there is provided a hitch receiver 40 having a hitch hole 41 having a quadrangular cross section.

The collapsible game hanger apparatus GH consists of a hoist structure 5 provided rearwardly of the cargo box 16 and a winch device 6 driven by an electric motor. The hoist structure 5 consists of a base bar 51, a mast 52 and a boom 53. These members are formed respectively of tubes having a quadrangle cross section. One end of the base bar 51 is inserted into the hitch hole 41 of the hitch receiver 40. The inserted base bar 51 is detachably fixed with using a fixing pin 42.

In the instant embodiment, for the sake of convenience at time of storage in its out of use state, the mast 52 is separated into a first mast 52a and a second mast 52b. At the time of use, the first mast 52a and the second mast 52b will be coupled to each other in linear abutment against each other. The first mast 52a and the other end of the base bar 51 are pivotally coupled to each other via a first hinge portion 541. The boom 53 and the second mast 52b are pivotally coupled to each other via a second hinge portion 542. The first mast 52a and the second mast 52b are pivotally coupled to each other via a third hinge portion 543. The first hinge portion 541 has a function of locking under a pivotal posture in which the base bar 51 and the first mast 52a extend perpendicularly relative to each other and a further function of locking under a pivotal posture in which the base bar 51 and the first mast 52a are overlapped with each other. The second hinge portion 542 has a function of locking under a pivotal posture in which the boom 53 and the second mast 52b extend perpendicularly relative to each other and a further function of locking under a pivotal posture in which the boom 53 and the second mast 52b are overlapped with each other. The third hinge portion 543 has a function of locking under a pivotal posture in which the first mast 52a and the second mast 52b extend straight relative to each other and a further function of locking under a pivotal posture in which the first mast 52a and the second mast 52b are overlapped with each other.

The posture of the hoist structure 5 shown in FIG. 2 and FIG. 3 is the posture for hoisting a heavy object such as a game. Under this posture, large moments are applied between the base bar 51 and the first mast 52a and between the boom 53 and the second mast 52b. For this reason, under this posture of the hoist structure 5, a first reinforcing member 55 is detachably attached between and coupled to the base bar 51 and the first mast 52a and a second reinforcing member 56 is detachably attached between and coupled to the boom 53 and the second mast 52b. To this end, the first reinforcing member 55 and the second reinforcing member 55 will be attached with pins or bolts.

The winch device 6 consists of a winch 60, a winch cable 61, and a pulley unit 62. The winch 60 is an electrically driven winch incorporating an electric motor and carries out winding/unwinding of the winch cable 60. The winch 60 includes a power supply plug 60a for power supply thereto. The winch mounting bracket 7 into which the power supply plug 60a is to be plugged is disposed, in this embodiment, at the top of a front wall 16a of the cargo box 16. Namely, the winch mounting bracket 7 forms a power supply socket 70 to be coupled with the power supply plug 60a for enabling electric conduction therewith. Further, to this winch mounting bracket 7, an electric power cable 71 for supplying electric power from a battery B is connected.

The pulley unit 62 includes a first pulley 621, a second pulley 622 and a third pulley 623 for guiding the winch cable 61. The first pulley 621 is attached to the second mast 52b and acts to change the direction of the winch cable 61 which has been drawn out of the winch 60 substantially horizontally above the cargo box 6 to an upper direction. The second pulley 622 is attached to the second hinge portion 542 provided at the coupling area between the second mast 52b and the boom 53 and acts to change the direction of the winch cable 60 which has been extended along the second mast 52b to an approximately horizontal direction. The third pulley 623 is attached to the leading end of the boom 53 and acts to allow the winch cable 60 which has been extended along the boom 53 to be suspended downwards therefrom. At the leading end of the winch cable 60, there is attached a gambrel 8 as a hanger tool.

Figure 4:
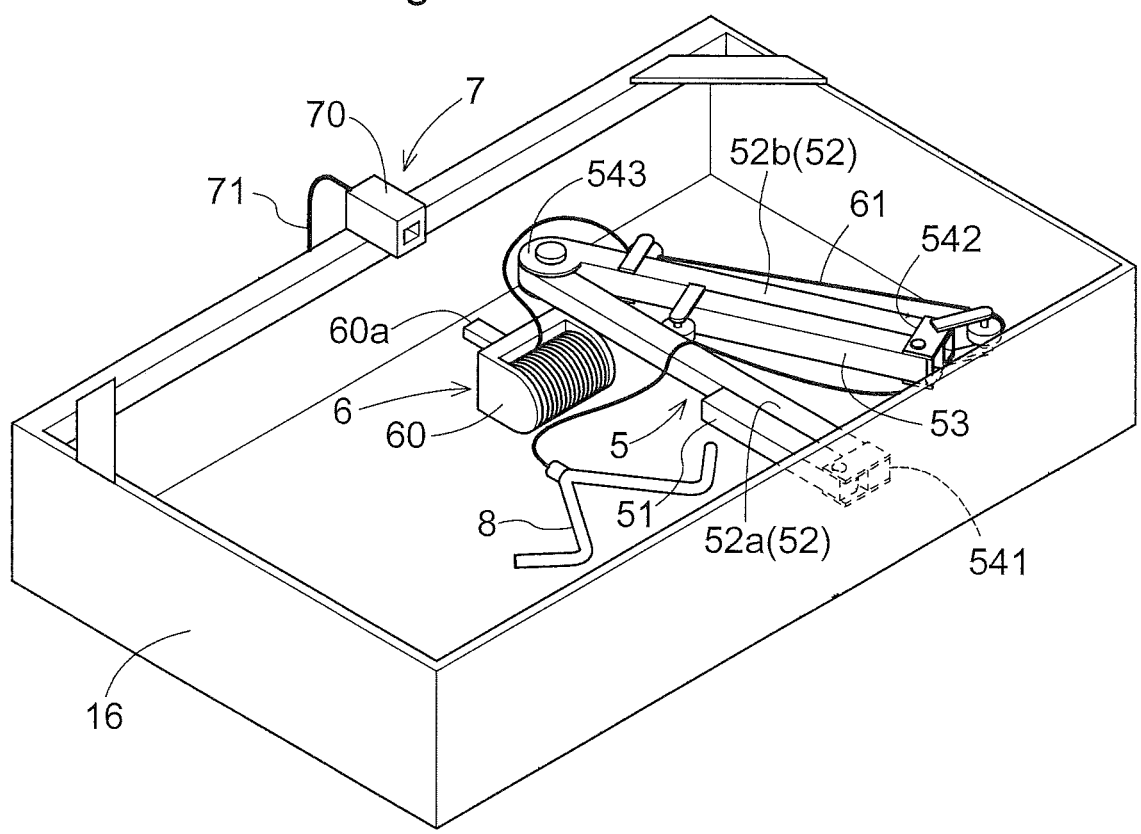
FIG. 4 is a perspective view showing the game hanger apparatus collapsed and stored inside the cargo box.

FIG. 4 shows the hoist structure 5 collapsed and stored inside the cargo box 16. In this FIG. 4 illustration, the winch 60 is attached to the winch mounting bracket 7. However, it may be detached from the winch mounting bracket 7 and stored inside the cargo box 16 together with the hoist structure 5.

Next, further embodiments will be described respectively.

(1) The winch mounting bracket 7 may be attached to a portion other than the top of the front wall 16f of the cargo box 16, e.g. to a side face of the front wall 16f, the upper structure 4U adjacent the cargo box 16 or a support deck supported to the upper structure 4U.

(2) The hoist structure 5 can be formed of members other than the angular tubes having a quadrangle cross section. For instance, it may be formed of a tube having any other polygonal cross section or a round cross section or can even be made at least partially of not a tube, but of a solid member.

(3) The mast 52 of the hoist structure 5 can be comprised of three or more separate parts. Further, if there is no problem for storage, etc., the mast 52 need not be separated into multiple parts.

The invention claimed is:

1. A utility vehicle having a collapsible game hanger apparatus, the utility vehicle comprising:
 a cargo box mounted on a rear structure of a vehicle body frame;
 a hitch receiver disposed under the cargo box and included in the rear structure;
 a hoist structure including;
  a base bar detachably attached to the hitch receiver,
  a mast attached via a lockable first hinge portion to a lower end portion of the base bar, and
  a boom attached via a lockable second hinge portion to an upper end of the mast such that the boom and mast are pivotally coupled to each other;
 a winch mounting bracket attached to the cargo box or a vehicle body constituent member;
 a winch device including;
  a winch detachably attached to the winch mounting bracket,
  a winch cable to be unwound from and wound back to the winch, and
  a pulley unit having a plurality of pulleys that guide the winch cable; and
 a gambrel attached to a leading end of the winch cable,
 the mast comprising a first mast portion and a second mast portion attached to each other by a lockable third hinge portion such that the first mast and second mast may be pivoted with respect to each other, from a lockable state in which they are in linear abutment with each other, to a collapsed state, whereby the game hanger may be selectively deployed from a collapsed state to a hoisting state by unfolding and pivoting the boom and mast with respect to each other, the base bar and mast with respect to each other, and the first mast portion and second mast portion with respect to each other, and may be returned to a collapsed state in which the boom and mast are folded parallel to each other, and the base bar and mast are folded parallel to each other, by folding and pivoting the boom and mast with respect to each other, the base bar and mast with respect to each other, and the first mast portion and second mast portion with respect to each other, such that the game hanger may be stored in the cargo box in the collapsed state without disassembly of the game hanger.

2. The utility vehicle of claim 1, wherein:
the winch comprises an electrically driven winch; and
a power supply socket for supplying power to the electrically driven winch mounted to the winch mounting bracket is provided in the winch mounting bracket.

3. The utility vehicle of claimm 1, wherein the winch is provided at a top of a front wall of the cargo box.

4. The utility vehicle of claim 1, wherein:
the pulley unit includes;
a first pulley that causes the winch cable extending horizontally from the electrically driven winch to extend upwards along the mast,
a second pulley that causes the winch cable extending upwards along the mast to extend along the boom toward the leading end of this boom, and
a third pulley that causes the winch cable extending from the leading end of the boom to be suspended downwards therefrom.

5. The utility vehicle of claim 1, wherein the pulleys of the pulley unit guide the winch cable over a top of at least portions of the mast and the boom.

6. A collapsible game hanger apparatus to be mounted on a utility vehicle having a cargo box in a rear structure of a vehicle body frame, the hanger apparatus comprising:
a hitch receiver disposed under the cargo box and included in the rear structure;
a hoist structure including;
a base bar detachably attached to the hitch receiver,
a mast attached via a lockable first hinge portion to an end portion of the base bar, and
a boom attached via a lockable second hinge portion to an upper end of the mast such that the boom and mast are pivotally coupled to each other;
a winch mounting bracket attached to the cargo box or a vehicle body constituent member;
a winch device including;
a winch detachably attached to the winch mounting bracket,
a winch cable to be unwound from and wound back to the winch, and
a pulley unit having a plurality of pulleys that guide the winch cable; and
a gambrel attached to a leading end of the winch cable, the mast comprising a first mast portion and a second mast portion attached to each other by a lockable third hinge portion such that the first mast and second mast may be pivoted with respect to each other, from a lockable state in which they are in linear abutment with each other to a collapsed state, whereby the game hanger may be selectively deployed from a collapsed state to a hoisting state by unfolding and pivoting the boom and mast with respect to each other, the base bar and mast with respect to each other, and the first mast portion and second mast portion with respect to each other, and may be returned to a collapsed state in which the boom and mast are folded parallel to each other, and the base bar and mast are folded parallel to each other, by folding and pivoting the boom and mast with respect to each other, the base bar and mast with respect to each other, and the first mast portion and second mast portion with respect to each other, such that the game hanger may be stored in the cargo box in the collapsed state as a unit without disassembly of the game hanger.

7. The collapsible game hanger of claim 6, wherein:
the winch comprises an electrically driven winch; and
a power supply socket for supplying power to the electrically driven winch mounted to the winch mounting bracket is provided in the winch mounting bracket.

8. The collapsible game hanger of claim 6, wherein the winch is provided at a top of a front wall of the cargo box.

9. The collapsible game hanger of claim 6, wherein:
the pulley unit includes;
a first pulley that causes the winch cable extending horizontally from the electrically driven winch to extend upwards along the mast,
a second pulley that causes the winch cable extending upwards along the mast to extend along the boom toward the leading end of this boom, and
a third pulley that causes the winch cable extending from the leading end of the boom to be suspended downwards therefrom.

10. The collapsible game hanger apparatus of claim 6, wherein the pulleys of the pulley unit guide the winch cable over a top of at least portions of the mast and the boom.

* * * * *